(12) United States Patent
Ueda

(10) Patent No.: US 9,219,899 B2
(45) Date of Patent: Dec. 22, 2015

(54) SIGNAL PROCESSING DEVICE

(71) Applicant: PANASONIC INTELLECTUAL PROPERTY MANAGEMENT CO., LTD., Osaka-shi, Osaka (JP)

(72) Inventor: Hisataka Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 13/773,657

(22) Filed: Feb. 22, 2013

(65) Prior Publication Data

US 2013/0223820 A1    Aug. 29, 2013

(30) Foreign Application Priority Data

Feb. 24, 2012    (JP) ................................. 2012-038445
Dec. 3, 2012     (JP) ................................. 2012-264527

(51) Int. Cl.
*H04N 9/80*    (2006.01)
*H04N 9/79*    (2006.01)
*H04N 5/76*    (2006.01)
*H04N 9/82*    (2006.01)
*G11B 27/034*  (2006.01)
*H04N 21/433*  (2011.01)
*H04N 21/482*  (2011.01)

(52) U.S. Cl.
CPC ............... *H04N 9/79* (2013.01); *G11B 27/034* (2013.01); *H04N 5/76* (2013.01); *H04N 9/8205* (2013.01); *H04N 21/4334* (2013.01); *H04N 21/4825* (2013.01)

(58) Field of Classification Search
CPC .................... H04N 21/26258; G06F 17/30053
USPC ........................................................ 386/285
See application file for complete search history.

(56) References Cited

U.S. PATENT DOCUMENTS

2004/0179816 A1*  9/2004  Takehana ......................... 386/52
2008/0235722 A1*  9/2008  Baugher et al. ................. 725/32

FOREIGN PATENT DOCUMENTS

| JP | 2000-013737 A | 1/2000 |
| JP | 2001-014829 A | 1/2001 |
| JP | 2004-274627 A | 9/2004 |

* cited by examiner

*Primary Examiner* — Hung Dang
*Assistant Examiner* — Girumsew Wendmagegn
(74) *Attorney, Agent, or Firm* — Shinjyu Global IP

(57) ABSTRACT

In the present signal processing device, a recording unit is configured to record an inputted signal into a recording medium. A switch input unit is configured to input signal selection information for selecting any one of a plurality of signals. A meta-input unit is provided independently from the switch input unit. The meta-input unit is configured to input metadata. A switch list managing unit is configured to associate the signal selection information and the metadata and manage the signal selection information and the metadata as a switch metadata information every time the signal selection information is inputted into the switch input unit. A playlist recording unit is configured to determine a reproduction duration of each clip and generate a playlist including the metadata based on the switch metadata information. The playlist recording unit is configured to output the playlist to the recording medium.

7 Claims, 17 Drawing Sheets

SWITCH LIST

| ORDER | SWITCH INFORMATION | | | METADATA |
|---|---|---|---|---|
| | SIGNAL PATH | START TIME | END TIME | EVALUATION METADATA |
| T1 | INPUT1 | time1 | time2 | NoInformation |
| T2 | INPUT3 | time2 | time3 | NG− |
| T3 | INPUT2 | time3 | time4 | OK |
| T4 | INPUT1 | time4 | time5 | OK |
| T5 | INPUT2 | time5 | time6 | NG+ |

FIG. 4

PLAYLIST

| ORDER | SOURCE CLIP | START TIME | END TIME | EVALUATION METADATA |
|---|---|---|---|---|
| T1 | Clip1 | time1 | time2 | NoInformation |
| T2 | Clip3 | time2 | time3 | NG- |
| T3 | Clip2 | time3 | time4 | OK |
| T4 | Clip1 | time4 | time5 | OK |
| T5 | Clip2 | time5 | time6 | NG+ |

SWITCH LIST

| ORDER | SWITCH INFORMATION ||| METADATA |
| | SIGNAL PATH | START TIME | END TIME | PRIORITY METADATA |
| --- | --- | --- | --- | --- |
| T1 | Clip1 | time1 | time2 | 1 |
| T2 | Clip1 | time2 | time3 | 5 |
| T3 | Clip1 | time3 | time4 | 3 |
| T4 | Clip1 | time4 | time5 | 2 |
| T5 | Clip1 | time5 | time6 | 4 |

PLAYLIST

| ORDER | SOURCE CLIP | START TIME | END TIME | EVALUATION METADATA |
|---|---|---|---|---|
| T1 | Clip1 | time1 | time2− | NoInformation |
| T2 | Clip3 | time2− | time3 | OK |
| T3 | Clip2 | time3 | time4 | OK |
| T4 | Clip1 | time4 | time5+ | OK |
| T5 | Clip2 | time5+ | time6 | OK |

FIG. 17

SIGNAL PROCESSING DEVICE

CROSS-REFERENCE TO RELATED APPLICATIONS

This application claims priority under 35 U.S.C. §119 to Japanese Patent Application No. 2012-038445 filed on Feb. 24, 2012 and Japanese Patent Application No. 2012-264527 filed on Dec. 3, 2012. The entire disclosures of Japanese Patent Application No. 2012-038445 and Japanese Patent Application No. 2012-264527 are hereby incorporated herein by reference.

BACKGROUND

1. Field of the Invention

The present invention relates to a signal processing device for evaluating results of switch operations with respect to a plurality of signal inputs.

2. Description of the Related Art

In recent years, devices have been popular that record a set of video signal data and/or a set of audio signal data in a file format into a randomly accessible recording medium (e.g., an optical disc, a semiconductor memory, etc.). For example, even in broadcasting stations and film-making companies, editing devices including such recording media have been used for executing video editing tasks and etc. To execute such video editing task, a material (e.g., a set of video signal data, a set of audio signal data, etc.) is recorded into a recording medium together with a set of metadata as a piece of additional information to such material. Thus, the set of metadata is used for promoting efficiency in an editing task and etc.

On the other hand, a plurality of channels of input audio/video signals are switched and a switched audio/video signal is distributed/transmitted in real-time broadcasting/distribution of an event, broadcasting transmission and etc. Further, a material (audio/video signal) is required to be recorded simultaneously with distribution/transmission thereof in secondarily using the material (e.g., editing a material and then selling the edited material).

As an exemplary method of executing such recording, Japan Laid-open Patent Application Publication No. JP-A-2004-274627 discloses a technology of creating an editing list based on a selection operation (switch operation) among a plurality of inputted videos. Further, the publication discloses a technology of executing digest reproduce and etc. by recording a set of video data selected by a selection operation and then reproducing the set of video data based on the editing list.

However, the conventional configuration disclosed in the aforementioned publication has, for instance, a drawback that, when an inappropriate video is distributed or recorded due to a switching operation executed at an erroneous timing and etc., it is difficult to efficiently search the inappropriate video or change the inappropriate video not to be reproduced.

In a signal processing device of the present invention, a set of metadata regarding evaluation in executing a switching operation is inputted, and is then recorded while being contained in a playlist. Further, search performance is herein enhanced with respect to an inappropriate switching and etc., and thereby, the inappropriate switching can be easily modified. Thus, according to the signal processing device of the present invention, convenience of a user can be enhanced.

SUMMARY

A signal processing device of the present invention includes a recording unit, a switch input unit, a meta-input unit, a switch list managing unit and a playlist recording unit. The recording unit is configured to record an inputted signal in a recording medium. The switch input unit is configured to input signal selection information for selecting any one of a plurality of signals. The meta-input unit is provided independently from the switch input unit. The meta-input unit is configured to input of metadata. The switch list managing unit is configured to associate the signal selection information and the metadata inputted in the meta-input unit with each other and manage the signal selection information and the metadata as switch metadata information every time the signal selection information is inputted into the switch input unit. The playlist recording unit is configured to determine a reproduction duration of each clip and generate a playlist including the metadata based on the switch metadata information. The playlist recording unit is further configured to output the playlist to the recording medium.

ADVANTAGEOUS EFFECTS OF INVENTION

According to the signal processing device of the present invention, a set of metadata can be provided for a switching operation in parallel to execution of the switching operation. Further, according to the signal processing device of the present invention, an inappropriate processing can be easily modified based on the set of metadata in post-shooting editing. Accordingly, collaboration of a plurality of people can be easily achieved in distribution, post-distribution editing and etc.

BRIEF DESCRIPTION OF THE DRAWINGS

Referring now to the attached drawings which form a part of this original disclosure:

FIG. 4 is a diagram showing a specific example of a switch list in the exemplary embodiment 1;

FIG. 5 is a diagram showing a specific example of a playlist in the exemplary embodiment 1;

FIG. 12 is a diagram showing a specific example of a switch list in the exemplary embodiment 2;

FIG. 17 is a diagram showing a specific example of a playlist, obtained as a result of a playlist changing processing, of the signal processing device 3 in the exemplary embodiment 3.

DETAILED DESCRIPTION

Exemplary embodiments will be hereinafter explained with reference to the attached drawings. It will be apparent to those skilled in the art from this disclosure that the following descriptions of the embodiments are provided for illustration only and not for the purpose of limiting the invention as defined by the appended claims and their equivalents.

Exemplary Embodiment 1

(1. Configuration of Signal Processing Device)

Figure 1:
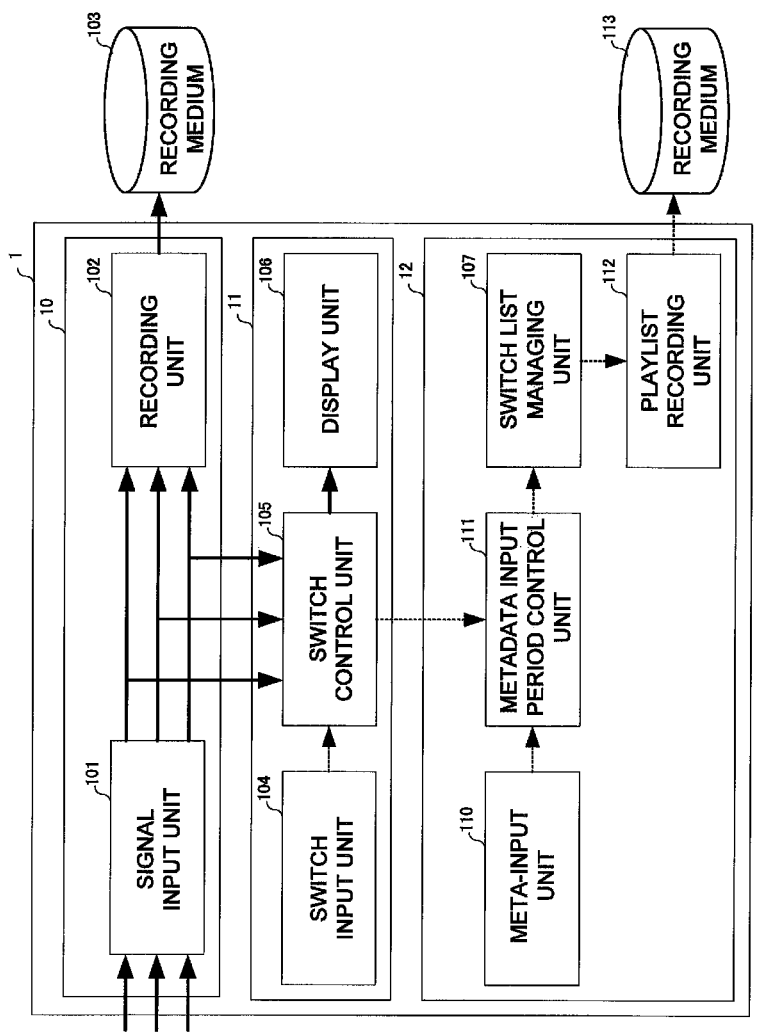
FIG. 1 is a block diagram showing a configuration of a signal processing device in an exemplary embodiment 1.

FIG. 1 is a block diagram showing a configuration of a signal processing device according to an exemplary embodiment 1. As shown in FIG. 1, a signal processing device 1 includes a signal recording unit 10, a switch unit 11 and a playlist unit 12. The signal recording unit 10 is connected to a recording medium 103, whereas the playlist unit 12 is connected to a recording unit 113. In the present exemplary embodiment, the signal processing device 1 is specifically is a video content management device having a switcher function and a signal recording function. Such device is usable for a variety of applications such as consumer applications intended for general users and professional applications intended for such users as business operators related to film making and those related to video system. Further, the signal processing device 1 is used, for instance, as a device for executing real-time distribution of a concert event or etc., and for editing a recorded material after the distribution. An edited video signal and etc. are herein assumed to be redistributed to general audience and be recorded in and sold as a package media. However, real-time distribution has chances that an inappropriate signal is distributed against user's intension due to a user's erroneous operation, an accident and etc. The present invention provides checking means for preventing it and means for modifying it in a subsequent editing phase.

The signal recording unit 10 has a plurality of channels of signal paths. The signal recording unit 10 is configured to record inputted signals of the plurality of channels in the recording medium 103 as sets of signal data on a channel basis and provide the signals to the switch unit 11. The term "signal" herein refers to a group of respective signals such as a video signal, an audio signal and etc.

The switch unit 11 is configured to select a signal to be presented to a user from the plurality of channels of signals provided thereto from the signal recording unit 10 based on a piece of switch operation information of a signal inputted by a user and further provide the piece of switch operation information to the playlist unit 12.

The playlist unit 12 is configured to generate a playlist based on the piece of switch operation information provided thereto from the switch unit 11 and a set of metadata to be inputted by a user and further record the generated playlist in the recording medium 113.

Next, respective components, included in the signal processing device 1 shown in FIG. 1, will be specifically explained. The signal recording unit 10 includes a signal input unit 101 and a recording unit 102. The signal input unit 101 is configured to input the plurality of channels of signals and execute a signal processing (e.g., input filtering) for the respective inputted signals. Subsequently, the signal input unit 101 is configured to provide the plurality of channels of signals to the recording unit 102 and the switch unit 11. Such signal processing is a technology widely used in general. Therefore, specific explanation thereof will not be hereinafter provided. The recording unit 102 is configured to record the plurality of channels of signals, provided thereto from the signal input unit 101, on a channel basis in the recording medium 103. Signals are herein arbitrarily converted into a desired format for recording (e.g., a compression format). For example, a video signal is compressed and encoded by means of a widely used method such as MPEG (Moving Picture Experts Group)-2 or MPEG-4 part 10/AVC (Advanced Video Coding). Further, an audio signal is also encoded by means of, for instance, RIFF (Resource Interchange File Format).

The switch unit 11 includes a switch input unit 104, a switch control unit 105 and a display unit 106. The switch input unit 104 is configured to input a piece of switch operation information for selecting a signal from a user. Further, the switch input unit 104 is configured to provide the piece of switch operating information to the switch control unit 105. For example, a signal selection timing (clock time) and a selection signal are inputted using buttons (not shown in the figures) corresponding to the respective signal paths. The switch control unit 105 is configured to provide the display unit 106 with a desired signal selected by a user from the plurality of signal paths (hereinafter referred to as a selection signal) and the plurality of channels of signals provided thereto from the signal input unit 101 as the signal recording unit 10 based on the piece of switch operation information provided thereto.

Further, the switch control unit 105 is configured to provide the piece of switch operation information to the playlist unit 12. The term "switch operation information" herein refers to a piece of signal selection related information containing a clock time of switching among signal paths and a selected signal path.

The display unit 106 is configured to present the selection signal provided thereto from the switch control unit 105 and the plurality of channels of signals to a user. For example, the display unit 106 is configured to present a video signal and/or an audio signal through a video monitor and/or a speaker.

The playlist unit 12 includes a meta-input unit 110, a metadata input period control unit 111, a switch list managing unit 107 and a playlist recording unit 112. The meta-input unit 110 is a block to which a set of metadata is inputted by a user. The meta-input unit 110 is configured to operate independently from switch input into the switch input unit 104. With the configuration, a switch operation and a metadata input operation can be shared by a plurality of (e.g., two) users and can be executed in parallel. The configuration of causing the meta-input unit 110 to operate independently from the switch input unit 104 can be implemented by providing the meta-input unit 110 and the switch input unit 104 as separate input units. A specific example of the configuration will be described below.

Further, the meta-input unit 110 is configured to provide the metadata input period control unit 111 with the set of metadata inputted thereto. The metadata input period control unit 111 is configured to control a period of enabling input of a set of metadata and determine whether the set of metadata provided thereto from the meta-input unit 110 should be accepted or discarded. The metadata input period control unit 111 is configured to associate the set of metadata with the piece of switch operation information provided thereto from the switch control unit 105 when the set of metadata is inputted within the metadata input enabled period. The metadata input period control unit 111 is then configured to provide the piece of information as a piece of switch metadata information to the switch list managing unit 107. By contrast, the metadata input period control unit 111 is configured to discard the set of metadata provided thereto from the meta-input unit 110 when the set of metadata is inputted outside the metadata input enabled period. A specific processing of the metadata input period control unit 111 will be described below.

The switch list managing unit 107 is configured to arbitrarily hold the piece of switch metadata information provided thereto from the metadata input period control unit 111 as a list (hereinafter referred to as a switch list). The held switch list is provided to the playlist recording unit 112. The playlist recording unit 112 is configured to create a playlist based on the switch list provided thereto from the switch list managing unit 107 and record the created playlist as a playlist file in the recording medium 113. Such processing of recording a set of information as a file is a technology widely used in general. Therefore, specific explanation thereof will not be hereinafter provided.

Specifically, the signal recording unit 10 can be implemented by providing a plurality of audio/video recording devices widely used in general. The switch unit 11 and the playlist unit 12 can be implemented by adding functions to a video switcher widely used in general. Such processing can be implemented by, for instance, a software program running on a general-purpose computer and hardware including an audio/video signal processing circuit, a microcomputer and a memory.

(2. Explanation of Related Information)
(2-1. Screen Configuration Example)

Figure 2:
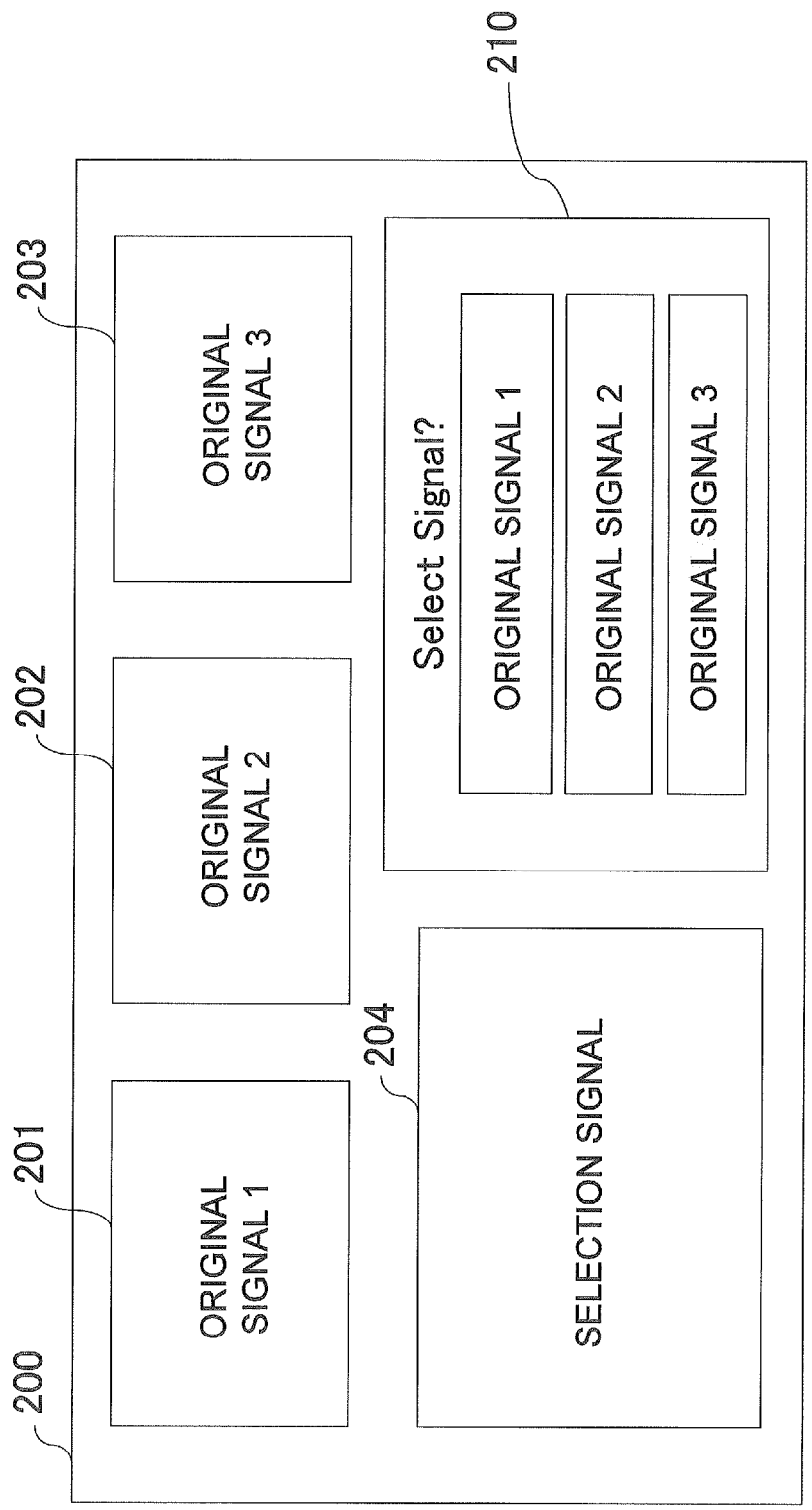
FIG. 2 is a diagram showing a screen configuration example regarding switch input of a signal processing device 1 in the exemplary embodiment 1.

A specific example will be explained for a configuration of causing the switch input unit 104 as the switch unit 11 and the meta-input unit 110 to operate independently from each other. FIG. 2 shows a screen configuration example for executing switch input with respect to the switch unit 11. A display screen 200 is designed to contain a plurality of original signal display areas 201, 202 and 203, a selection signal display area 204 and a switch information input area 210. The original signal display areas 201, 202 and 203 are respectively configured to display therein the plurality of channels of signals provided from the switch control unit 105 on a signal path basis. The selection signal display area 204 is configured to display therein the selection signal selected in the switch control unit 105. The display unit 106 shown in FIG. 1 is configured to execute a display processing for the original signal display areas 201, 202 and 203 and the selection signal display area 204. The switch information input area 210 corresponds to the switch input unit 104 shown in FIG. 1 and is configured to input selection of a signal path and the timing thereof. FIG. 2 shows an exemplary case of three signal paths.

Figure 3:
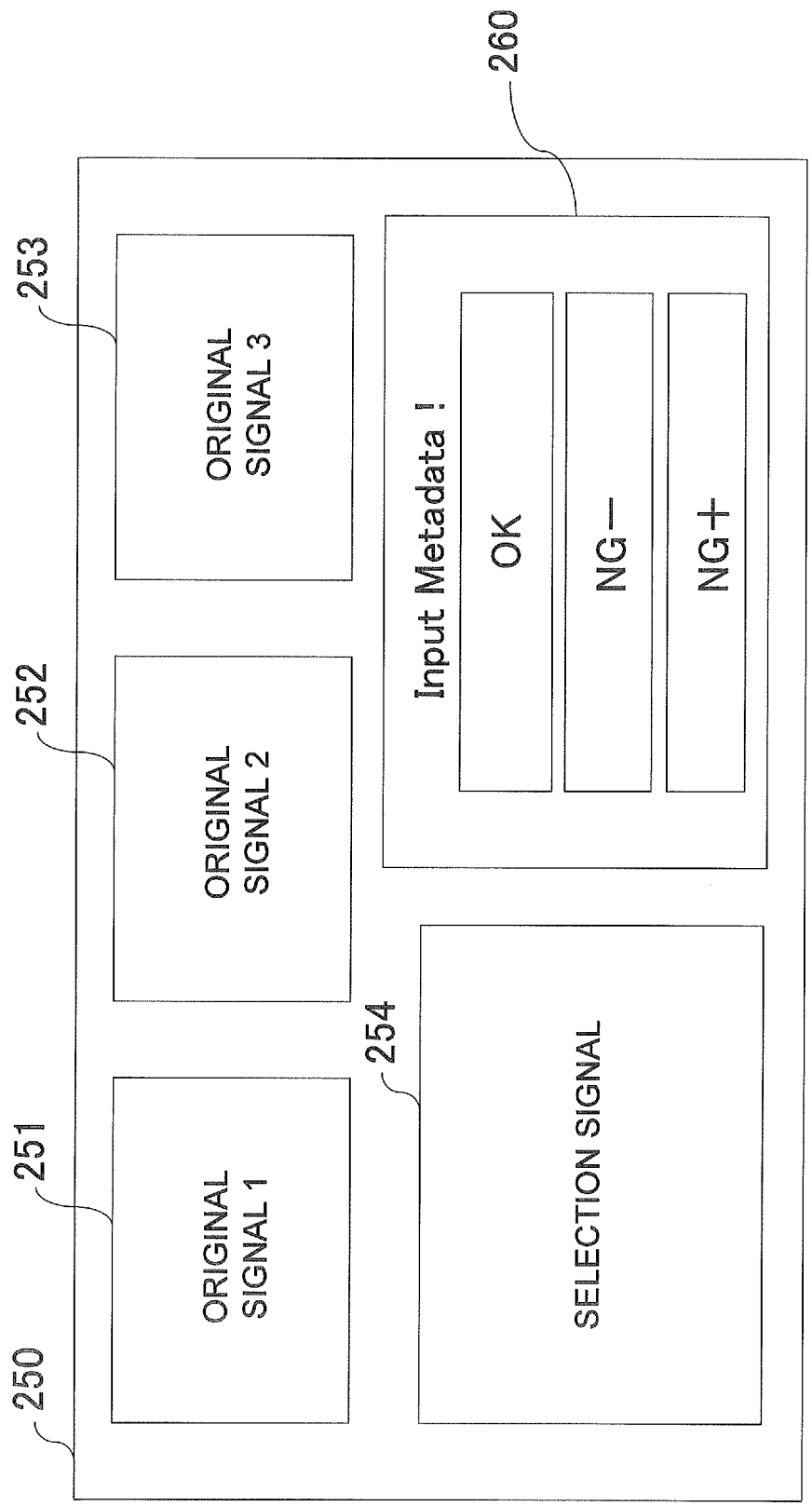
FIG. 3 is a diagram showing a screen configuration example regarding metadata input of the signal processing device 1 in the exemplary embodiment 1.

On the other hand, FIG. 3 shows a screen configuration example for receiving a set of metadata inputted into the playlist unit 12. A display screen 250 is designed to contain original signal display areas 251, 252 and 253, a selection signal display area 254 and a metadata input area 260. The original signal display areas 251, 252 and 253 are configured to display therein the same signals as those displayed in the original signal display areas 201, 202 and 203 shown in FIG. 2, respectively. The selection signal display area 254 is configured to display therein the same signal as that displayed in the selection signal display area 204 shown in FIG. 2. The metadata input area 260 corresponds to the meta-input unit 110 shown in FIG. 1. For example, the meta data input area 260 is configured to input any one of sets of metadata "OK", "NG−" and "NG+". Specific explanation of the sets of metadata will be explained below.

With the aforementioned configuration, input of a set of metadata can be received in parallel to receipt of switch input. Further, without being contained in the display screen 250, the original signal display areas 251, 252 and 253 and the selection signal display area 254 may be configured to share display areas with the original signal display areas 201, 202 and 203 and the selection signal display area 204 shown in FIG. 2, respectively. It should be noted that FIGS. 2 and 3 explain the example of three original signal display areas and three signal paths. However, the number of signal paths may be other than three when the number of areas/signals is changed in accordance with the number of signal paths. In this case, the processing similar to that explained in the present exemplary embodiment may be executed as the respective processing for respective signal paths. Further, the aforementioned explanation has been provided using an example of a video signal. However, audio signals may be also presented to a user while signal paths thereof are switched in conjunction with video signals.

Further, a user's operation has been explained with an example of pressing buttons (not shown in the figures) mounted on the switch input unit 104 and the meta-input unit 110. However, without being provided with the switch input unit 104 and the meta-input unit 110, a display unit alone may be configured to enable a user's operation as long as the display unit is a monitor provided with a touch operating environment (e.g., a touch panel). For example, a user may be allowed to touch and operate the portions displaying data input options in the switch information input area 210 of the screen configuration example shown in FIG. 2 and the metadata input area 260 of the screen configuration example shown in FIG. 3.

(2-2. Switch List)

FIG. 4 shows a specific configuration example of a switch list. The term "switch list" refers to a list of a single or plurality of pieces of switch metadata information. For example, a piece of switch metadata information is herein set to have a piece of switch information and a set of metadata. The piece of switch information is formed by items "ORDER", "SIGNAL PATH", "START TIME" and "END TIME", whereas the set of metadata is associated with the piece of switch information (an item "EVALUATION METADATA" in the example of FIG. 4). The term "switch information" herein refers to a piece of information to be set based on a piece of switch operation information. The items "SIGNAL PATH" and "START TIME" in a piece of switch information respectively correspond to those in a piece of switch operation information. The item "END TIME" in a piece of switch information is set based on the item "START TIME" in a piece of switch operation information (e.g., based on the item "START TIME" in a next piece of switch operation information).

Specific explanation will be provided for a configuration example of the switch list in FIG. 4. The item "ORDER" herein represents the chronological order in the switch list. FIG. 4 shows that time is elapsed in the sequential order of orders "T1", "T2", "T3", "T4" and "T5". The item "SIGNAL PATH" represents types of a plurality of channels of signal paths. In the example of FIG. 4, any one is selected from the three signal paths "INPUT1", "INPUT2" and "INPUT3". The signal path "INPUT1", an original signal 1 of the original signal display area 201 in FIG. 2 and an original signal 1 of the original signal display area 251 in FIG. 3 are corresponded. Similarly, the signal path "INPUT2", an original signal 2 of the original signal display area 202 in FIG. 2 and an original signal 2 of the original signal display area 252 in FIG. 3 are corresponded to each other, whereas the signal path "INPUT3", an original signal 3 of the original signal display area 203 in FIG. 2 and an original signal 3 of the original signal display area 253 in FIG. 3 are corresponded to each other. The item "START TIME" represents a clock time when a user executed a switch operation and the relevant signal path began to be selected. For example, FIG. 4 shows that in the piece of switch metadata information with the order "T1", the signal path "INPUT1" was selected at the clock time "time1". It should be noted that the initial start time and the initial signal path in the switch list may be configured to be explicitly inputted by a user at the start of an operation. Alternatively, an initial value may be preliminarily set for the initial signal path, and further, the initial signal with the initial value and a clock time of activating the device as the initial start time may be held in the switch list. The item "END TIME" represents a clock time when the relevant signal path finished to be selected, i.e., a clock time when another signal path began to be selected. FIG. 4 shows an example that the signal path "INPUT1" is selected in a period of time from the clock time "time1" to the clock time "time2". A metadata value, associated with a piece of switch information, is set for a set of metadata.

It should be noted that the switch list can exert an advantageous effect of the present invention as long as it includes at least a piece of information representing the order, the signal path and the start time, and a set of metadata. Further, in the aforementioned example, the order of pieces of switch metadata information is explicitly contained in the switch list. However, the order of pieces of switch metadata information may be determined based on the sequential order listed in the switch list from top to bottom.

(2-3. Playlist)

FIG. 5 shows a specific configuration example of a playlist. For example, the playlist is formed by one or more reproduction duration elements (hereinafter referred to as playlist elements). Each playlist element includes items "ORDER", "SOURCE CLIP", "START TIME" and "END TIME" and an item "EVALUATION METADATA" as a set of metadata. The item "ORDER" represents a chronological order in a playlist. FIG. 5 shows that time is elapsed in the sequential order of orders "T1", "T2", "T3", "T4" and "T5". The item "SOURCE CLIP" represents a set of signal data corresponding to each signal path recorded in the recording medium 103. Further, when being reproduced, the item "SOURCE CLIP" represents a clip as a reproduction target. Here, the term "clip" refers to a set of signal data recorded in a period of time from start to end of recording as a unit of time. A set of signal data is recorded on a signal channel basis, and therefore, the number of channels corresponds to the number of clips. A set of signal data contains a set of video signal data for recording a video signal and a set of audio signal data for recording an audio signal. The item "START TIME" represents a clock time when a relevant clip recorded in the recording medium 103 begins to be reproduced. Also, the item "START TIME" corresponds to a clock time when a user executes a switch operation and a relevant signal path in a switch list begins to be selected. The item "END TIME" represents a clock time when a relevant clip recorded in the recording medium 103 finished to be reproduced. Also, the item "END TIME" corresponds to a clock time when another signal path in the switch list begins to be selected. The item "EVALUATION METADATA" as a set of metadata is set to have a value of a set of metadata associated with a piece of switch information in creating a playlist based on a switch list. Specific explanation will be provided below for the method of generating a playlist based on a switch list and the processing of associating a set of metadata and a piece of switch information.

When such playlist is reproduced, a source clip in the initial playlist element is reproduced in a period of time from the start time to the end time, and a clip in the next playlist element is then reproduced. For example, in the example of FIG. 5, the reproduction device is configured to reproduce a set of signal data from the clock time "time1" to the clock time "time2" among sets of signal data recorded as a source clip "Clip1" in the initial order "T1". Next, the reproduction device is configured to reproduce a set of signal data from the clock time "time2" to the clock time "time3" among sets of signal data recorded as a source clip "Clip3" in the order "T2".

Further, such playlist may be recorded in a file format by means of, for instance, a recording method with a CSV (Comma Separated Values) format where each playlist element is recorded in a text format and character strings are separated with ", (comma)" or a recording method with a markup language such as an XML (eXtensible Markup Language) format. The present invention does not depend on a file recording format. Therefore, a playlist can be recorded by means of an arbitrary method that can be easily implemented. In the present exemplary embodiment, a playlist is assumed to be recorded in a CVS format as a text format. The processing of recording and reproducing such playlist and the processing of recording such playlist in a file format are technologies widely used in general. Therefore, specific explanation thereof will not be hereinafter provided. It should be noted that the order of playlist elements in a playlist may be determined based on the sequential order listed in the playlist from the top to bottom.

(2-4. Switch Information)

Figure 6:
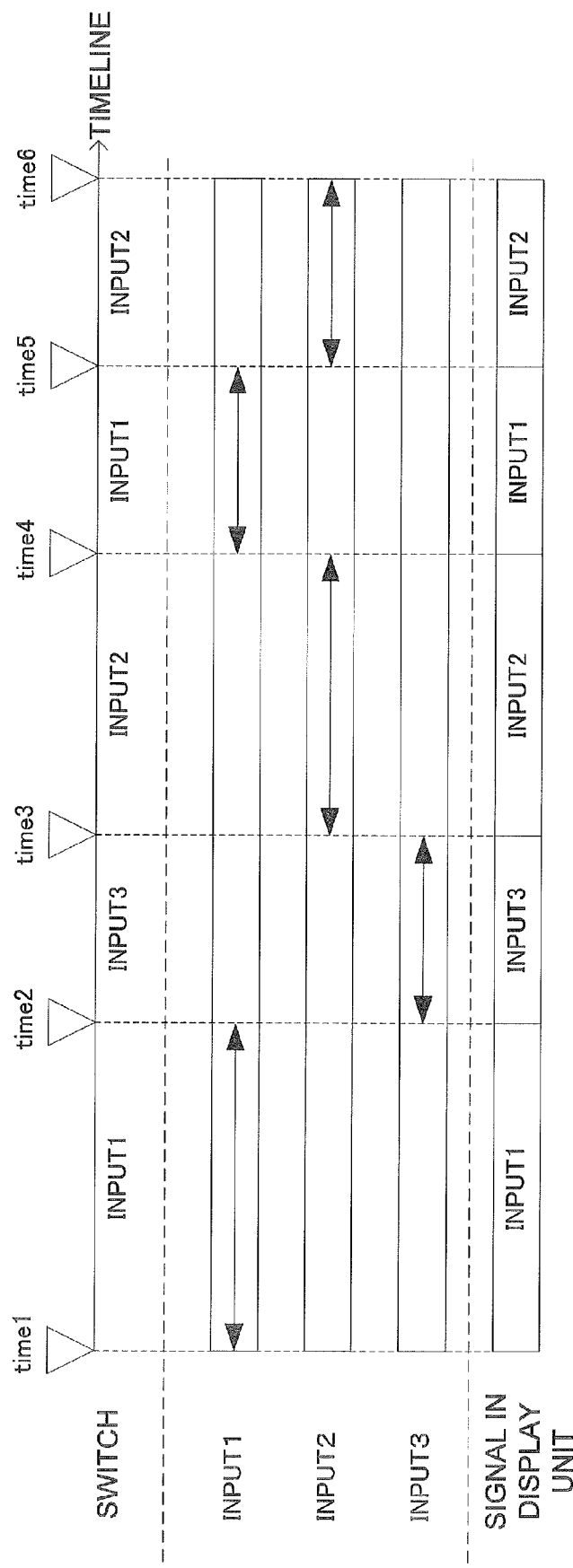
FIG. 6 is a schematic diagram showing a relation among input signals, switch operations and output signals of the signal processing device 1 in the exemplary embodiment 1.

FIG. 6 is a conceptual diagram showing a relation among an input signal, a switch operation and an output signal in the signal processing device 1. FIG. 6 shows a relational concept between three signal paths "INPUT1", "INPUT2" and "INPUT3" and signals (i.e., selection signals) to be displayed and outputted as the selection signal playlist area 204 by the display unit 106, where the horizontal axis is set as a timeline. For example, FIG. 6 shows that a selected signal path is switched from the signal path "INPUT1" to the signal path "INPUT3" at the clock time "time2".

The signal recording unit 10 is configured to record a switch operation from its start to its end as a clip on a signal path basis. For example, in the example of FIG. 6, sets of signal data in a period of time from the clock time "time1" to the clock time "time6" are recorded as clips. It should be noted that the start time (the clock time "time1" in FIG. 6) of an initial piece of switch information in the switch list may be set by a user's explicit input at the start of operation and the clock time herein set may be configured to be held as the start time. Alternatively, a clock time of activating the device may be configured to be held as the start time. On the other hand, the end time (the clock time "time6" in FIG. 6) of the last piece of switch information in the switch list may be set by a user's explicit input at the end of an operation and the clock time herein set may be configured to be held as the end time. Alternatively, a clock time of deactivating the device may be configured to be held as the end time. As to recording of clips, for instance, when an operation is started at the clock time "time1" and is then ended at the clock time "time6", recording of clips is started in conjunction with a clock time at the start of the operation or a clock time of activating the device (the clock time "time1" in the example of FIG. 6), whereas recording of clips is stopped in conjunction with a clock time at the end of the operation or a clock time of deactivating the device (the clock time "time6" in the example of FIG. 6).

(2-5. Relation Between Clips and Playlist)

Figure 7:
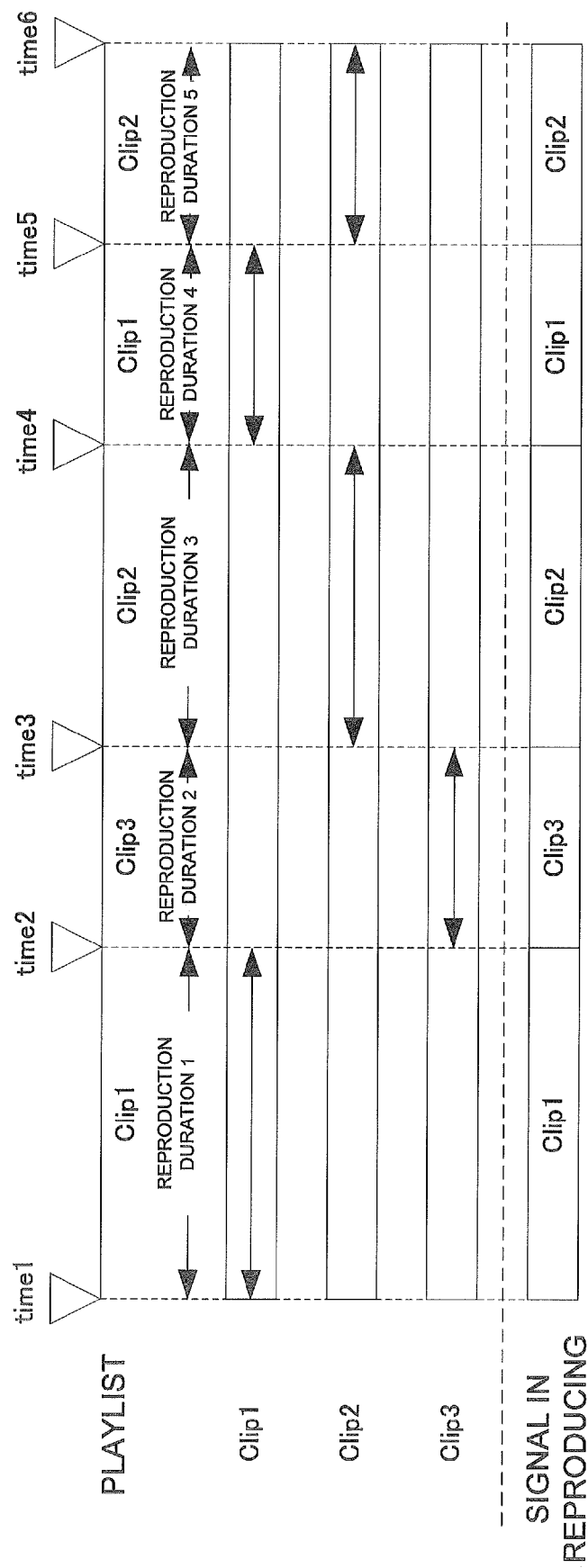
FIG. 7 is a schematic diagram showing a relation between clips and a playlist in the exemplary embodiment 1.

FIG. 7 is a conceptual diagram showing a relation between clips to be recorded and a playlist. FIG. 7 shows an exemplary case that an operation is started at the clock time "time1" and is then ended at the clock time "time6". Sets of signal data of signals from the clock time "time1" to the clock time "time6" are assumed to be recorded as respective clips (Clip1, Clip2 and Clip3) in the recording medium 103. In FIG. 7, the top line "PLAYLIST" represents a concept of a playlist, whereas the bottom line "SIGNAL IN REPRODUCING" represents a reproduced result. For example, the clip "Clip3" represents that a set of signal data is reproduced in a period of time from the clock time "time2" to the clock time "time3". When respective clips are sequentially reproduced based on a playlist, a playlist file is read out of the recording medium 113. Then, the respective clips (Clip1, Clip2 and Clip3) are reproduced based on the playlist elements (e.g., order, reproduction duration, etc.) in the playlist. Such reproducing processing is a technology widely used in general. Therefore, specific explanation thereof will be not hereinafter provided.

(2-6. Metadata)

Next, specific explanation will be provided for a set of metadata to be used in the signal processing device 1. In the exemplary embodiment 1, the item "EVALUATION METADATA" is exemplified as a set of metadata. The item "EVALUATION METADATA" is a set of metadata for evaluating validity of either a switch operation or a duration determined based on the switch operation. A specific method of inputting a set of metadata will be described below. The item "EVALUATION METADATA" is contained in the playlist as shown in FIG. 5 and is recorded as a playlist file in the recording medium 113. Further, in reproducing, a playlist file is configured to be read out of the recording medium 113 and values of the item "EVALUATION METADATA" in respective orders (e.g., the orders "T1" to "T5" in FIG. 5) are configured to be interpreted. For example, the interpreted values of the item "EVALUATION METADATA" are presented to a user while being displayed as marks on a table of clips listed in a playlist or on a timeline as generally used in a video editing device.

In the exemplary embodiment 1, "OK", "NG−", "NG+" and "NoInformation" are defined as values of the item "EVALUATION METADATA". The value "OK" represents that a switch operation has no error and no problem. The value "NG−" represents that a switch operation is delayed and is required to be forwardly shifted along the timeline if actually modified. The value "NG+" represents that a switch operation is advanced and is required to be backwardly shifted along the timeline if actually modified. The value "NoInformation" represents that there is no information for evaluating the validity of a switch operation.

(2-7. Method of Inputting Metadata)

Figure 8:
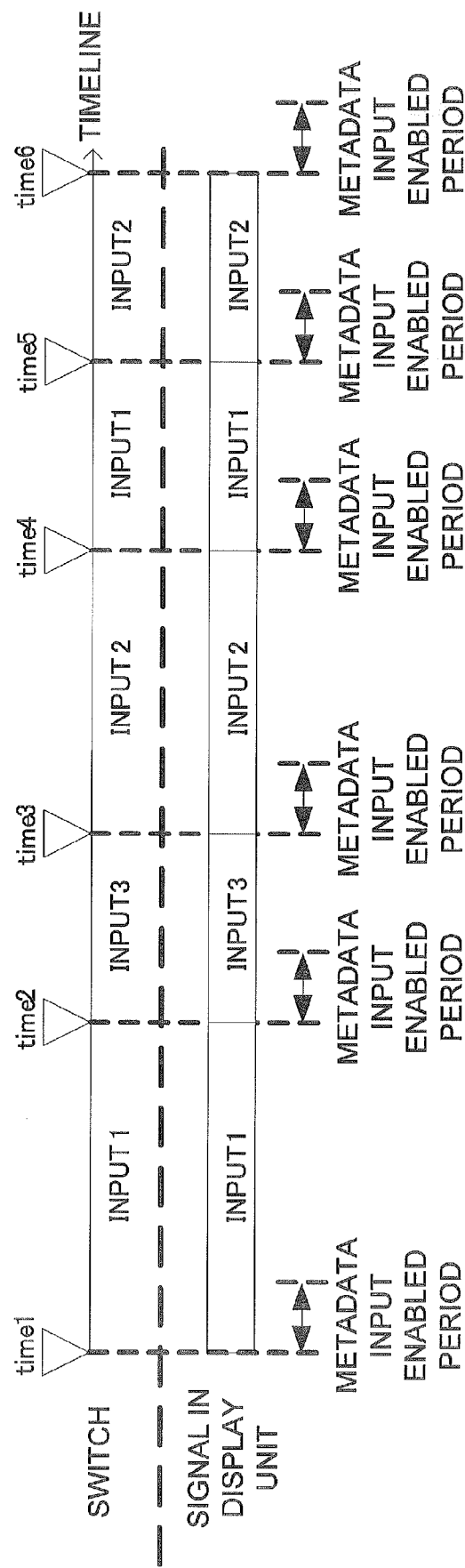
FIG. 8 is a schematic diagram showing a metadata input enabled period of the signal processing device 1 in the exemplary embodiment 1.

FIG. 8 is a conceptual diagram representing a metadata input enabled period. In FIG. 8, a line "SWITCH" represents a timing when a switch operation is executed, whereas a line "SIGNAL IN DISPLAY UNIT" represents a signal (i.e., a selection signal) to be displayed in the selection signal display area 204 of the display unit 106. Input of a set of metadata is configured to be enabled only in a predetermined period of time immediately after a switch operation is executed. The predetermined period of time for enabling input of a set of metadata is herein referred to as "a metadata input enabled period". A user is required to input a set of metadata through the meta-input unit 110 within the metadata input enabled period. The metadata input enabled period is provided for easily associating the inputted set of metadata and an object to be provided with the set of metadata (timing of a switch operation) regarding a signal and a switch operation that proceed with time. From the perspective of a user, limiting the metadata input to a predetermined period of time is also advantageous in that the user can clearly recognize the object to be associated with a set of metadata.

Next, explanation will be provided for a specific operation example in inputting a set of metadata. For example, a character string or a mark, indicating that a set of metadata can be inputted into the metadata input area 260 in FIG. 3, is displayed for presenting the metadata input enabled period to a user. For example, in the example of FIG. 3, a character string "Input Metadata!" is displayed, and further, metadata options are displayed below the character string. The options are associated with, for instance, buttons or etc. and a set of metadata is configured to be inputted when a user presses a button (not shown in the figures) corresponding to a set of metadata. The character string or the mark, indicating that metadata input is enabled, is configured not to be displayed outside the metadata input enabled period for presenting that metadata input is disabled.

Next, explanation will be provided for a specific processing of inputting a set of metadata in the metadata input period control unit 111. The metadata input period control unit 111 is configured to activate a metadata input enabled state at and after the timing when the switch control unit 105 informs of a piece of switch operation information. Then, the metadata input period control unit 111 is configured to deactivate the metadata input enabled state after elapse of a predetermined period of time. Further, an inputted set of metadata is associated with a switch operation as a trigger of starting the metadata input enabled period in the processing of associating an inputted set of metadata with an object to be provided with the set of metadata (a piece of switch operation information containing a switch timing).

For example, when no set of metadata has been inputted within the metadata input enabled period, a metadata value, indicating that no set of metadata has been inputted, is recorded. It should be noted that, in this case, no metadata value may be recorded for indicating that no set of metadata has been inputted.

In the exemplary embodiment 1, for instance, the metadata value "NoInformation" is recorded. The metadata value "NoInformation" is configured to be held in the switch list when no set of metadata has been inputted within the metadata input enabled period. More specifically, the metadata value "NoInformation" is configured to be held in the switch list when a switch operation of activating a metadata input enabled period is executed. Further, a playlist is created based on the switch list.

Further, when a switch operation is executed anew within the metadata input enabled period, the on-going switch input enabled period is finished, for instance, before a predetermined period of time is elapsed. In other words, the on-going switch input enabled period is set to be short. It should be noted that, when a switch operation is executed anew in the metadata input enabled period, starting of another metadata input enabled period may be delayed for the new switch operation. Through the processing, it is possible to prevent overlapping between the on-going metadata input enabled period and another metadata input enabled period for the new switch operation.

It should be noted that the predetermined period, set for the metadata input enabled period, may be arbitrarily set as a period allowing a user to input a set of metadata. When the predetermined period is too short, chances are that a set of metadata cannot be inputted. By contrast, when the predetermined period is too long, it is impossible to cope with a quick switch operation. Therefore, the predetermined period may be set to be roughly five seconds.

(3. Action of Signal Processing Device)

(3-1. Action at Start of Switch Operation)

The action of the signal processing device 1 will be specifically explained. Firstly, an action at the start of a switch operation will be specifically explained. A user gives an instruction of starting a switch operation to the switch control unit 105 through the switch input unit 104. The switch control unit 105 enables a switch operation (signal selection) based on the inputted switch operation start instruction. Simultaneously, the switch control unit 105 provides the metadata input period control unit 111 with a switch operation start time (the clock time "time1" in the example of FIG. 6) and a selected signal path (the signal path "INPUT1" in the example of FIG. 6) as a piece of switch operation information. Further, the switch control unit 105 instructs the recording unit 102 to start recording (not shown in the figures). The metadata input period control unit 111 provides the switch list managing unit 107 with the supplied piece of switch operation information and a supplied set of inputted metadata. It should be noted that it is less advantageous to provide the item "EVALUATION METADATA" at the start of a switch operation. Therefore, inputting of a set of metadata is not herein required. When no set of metadata has been inputted, the switch list managing unit 107 is provided with "NoInformation" as a value of the item "EVALUATION METADATA". In inputting a set of metadata, a processing similar to the metadata processing in a switch operation will be executed. The switch list managing unit 107 holds a piece of switch information regarding a switch operation from its start to its end. At the start of a switch operation, a switch operation start time (the clock time "time1" in the example of FIG. 6) and a selected signal path (the signal path "INPUT1" in the example of FIG. 6) are held in the top of the list. At this point of time, for instance, respective information items, except for the end time, with the order "T1" of FIG. 4 are held as the switch list.

On the other hand, the recording unit 102 starts a recording processing (e.g., an encoding processing, a clip recording processing, etc.) based on the recording start instruction from the switch control unit 105. It should be noted that the recording unit 102 has been explained with an example that signals of a plurality of channels are recorded by a single block. However, the recording unit 102 may include a plurality of recording units configured to record signals on a channel basis (i.e., a plurality of recording units corresponding to respective channels or signal paths).

(3-2. Action in Switch Operation)

Next, an action in a switch operation will be specifically explained. For example, a user gives an instruction of a switch operation to the switch control unit 105 through the switch input unit 104, when judging necessity of switching between signal paths as a result of checking of signals of the respective original signal display areas (201, 202 and 203) displayed on the display screen 200 shown in FIG. 2. The switch control unit 105 provides the display unit 106 with a signal of a selected signal path as a selection signal based on the inputted switch operation instruction. Further, the switch control unit 105 provides the metadata input period control unit 111 with a piece of switch operation information. A piece of switch operation information in a switch operation herein contains a clock time when a switch operation is instructed and a selected signal path. For example, when the selected signal path is switched into the signal path "INPUT3" at the clock time "time2" in FIG. 6, the clock time when a switch operation was instructed is the clock time "time2" and the selected signal path is the signal path "INPUT3". For example, the display unit 106 displays the selection signal on the selection signal display area 204 shown in FIG. 2 and the selection signal display area 254 shown in FIG. 3.

On the other hand, a set of metadata is inputted by, for instance, another user different from the user that gave the instruction of a switch operation to the switch input unit 104. The configuration is employed due to the reason that a value of the item "EVALUATION METADATA" for a switch operation can be more efficiently provided by another user than by the user that gave the instruction of a switch operation. A user (another user) inputs a set of metadata into the meta-input unit 110. The meta-input unit 110 provides the metadata input period control unit 111 with the inputted set of metadata (category or value). In the present exemplary embodiment, any of "OK", "NG−" and "NG+" is provided as a value of the item "EVALUATION METADATA". It should be noted that "NoInformation" is a data value to be provided when no data value has been inputted for the item "EVALUATION METADATA". In other words, the data value "NoInformation" is not provided from the meta-input unit 110 but is provided from the switch list managing unit 107. As a metadata input enabled period, the metadata input period control unit 111 sets a predetermined period of time from the clock time when a piece of switch operation information was supplied. The metadata input period control unit 111 discards a set of metadata inputted outside the metadata input enabled period. Further, the metadata input period control unit 111 provides the switch list managing unit 107 with a set of metadata inputted within the metadata input enabled period together with a piece of switch operation information supplied from the switch control unit 105.

The switch list managing unit 107 additionally writes the supplied piece of switch operation information and the supplied set of metadata into the switch list held therein as a piece of switch metadata information. Firstly, the switch list managing unit 107 generates a piece of switch information based on the supplied piece of switch operation information. Then, the switch list managing unit 107 generates a piece of switch metadata information by associating the generated piece of switch information and the supplied set of metadata. Now, explanation will be provided for a specific example of generating a piece of switch information from a piece of switch operation information. A clock time when a switch operation is instructed, contained in the piece of switch operation information, is set as a start time of a new subsequent piece of switch information, and simultaneously, as an end time of an immediately previous piece of switch information. On the other hand, the selected signal path, contained in the piece of switch operation information, is set as a signal path to be handed as a piece of switch information. Next, explanation will be provided for association between a piece of switch information and a set of metadata. The piece of switch information is associated with the set of metadata inputted within the metadata input enabled period attributed to notification of the piece of the switch operation information. When no set of metadata has been inputted within the metadata input enabled period, the value "NoInformation" is set. The piece of switch information and the set of metadata are set as a piece of switch metadata information. A switch list example in FIG. 4 corresponds to a switch operation example in FIG. 6. For example, the order "T2" in the switch list of FIG. 4 corresponds to the clock time "time2" in FIG. 6. In the switch operation at the clock time "time2", a piece of switch metadata information in the order "T2" is added to the switch list. At this point of time, however, the end time in the order "T2" has not been determined yet. Further, in the switch operation at the clock time "time2", the end time in the order "T1" is set to be the clock time "time2". In the subsequent chronological order, the clock times "time3", "time4" and "time5" in FIG. 6 respectively correspond to the orders "T3", "T4" and "T5".

Further, after the additional writing processing into the switch list, the switch list managing unit 107 provides the playlist recording unit 112 with the switch list and instructs the playlist recording unit 112 to record the playlist. The playlist recording unit 112 executes a playlist generating processing and a playlist recording processing based on the playlist record instruction from the switch list managing unit 107. A playlist is herein recorded on a switch operation basis in order to prevent a piece of playlist information from being erased when a set of signal data is reproduced using a playlist before a switch operation is entirely finished or when the device is powered off in the course of a switch operation. It should be noted that playlist recording may be collectively executed at the end of a switch operation, if the above problems are out of the scope of interest.

Next, specific explanation will be provided for a playlist recording processing in the playlist recording unit 112. Firstly, the playlist recording unit 112 generates a playlist from the switch list provided thereto from the switch list managing unit 107. For example, the playlist shown in FIG. 5 is herein generated based on the switch list shown in FIG. 4. The items "ORDER", "SIGNAL PATH", "START TIME", "END TIME" and "EVALUATION METADATA" in a switch list (e.g., the switch list in FIG. 4) respectively correspond to the items "ORDER", "SOURCE CLIP", "START TIME", "END TIME" and "EVALUATION METADATA" in a playlist (e.g., the playlist in FIG. 5). Further, the signal paths "INPUT1", "INPUT2" and "INPUT3" respectively correspond to the clips "Clip1", "Clip2" and "Clip3". The correspondence is implemented by causing the recording unit 102 to preliminarily set recording clips corresponding to the signal paths "INPUT1", "INPUT2" and "INPUT3" to be "Clip1", "Clip2" and "Clip3". Further, the items "START TIME", "END TIME" and "EVALUATION METADATA" in the switch list respectively correspond to the items "START TIME", "END TIME" and "EVALUATION METADATA" in the playlist. Therefore, the same value is set for the corresponding items between the switch list and the playlist. Through the correspondence and value setting, such playlist as shown in FIG. 5 can be generated. The generated playlist is then recorded as a playlist file in the recording medium 113. It should be noted that playlist recording by the playlist recording unit 112 is implemented by recording the playlist generated based on the switch list at the point of time. A playlist, generated again in the next switch operation, is recorded in the recording medium 113 by overwriting the existing playlist. Through such configuration of regenerating a playlist on a switch operation basis and recording the regenerated playlist in the recording medium 113, it is possible to read out a playlist file before the end of a switch operation and reproduce a clip based on the read-out playlist. Accordingly, it is possible to check and modify the playlist, for instance, by continuing an on-going switch operation, and simultaneously, by reproducing a result of a previous switch operation.

(3-3. Action at End of Switching Operation)

Next, specific explanation will be provided for an action in finishing a switch operation. Firstly, a user gives an instruction of finishing a switch operation to the switch control unit 105 through the switch input unit 104. The switch control unit 105 finishes receiving a switch operation (signal selection) based on the inputted switch operation finishing instruction. Simultaneously, the switch control unit 105 provides the metadata input period control unit 111 with a switch operation start time (the clock time "time6" in the example of FIG. 6) and the signal path at this time (the signal path "INPUT2" in the example of FIG. 6) as a piece of switch operation information. Further, the switch control unit 105 instructs the recording unit 102 to stop recording (the processing is not shown in the figures). The metadata input period control unit 111 provides the switch list managing unit 107 with the supplied piece of switch operation information. It should be noted that inputting of a set of metadata is not required because it is less advantageous to provide a value of the item "EVALUATION METADATA" in finishing a switch operation. In this case, the switch list managing unit 107 is provided with "NoInformation" as a value of the item "EVALUATION METADATA". At the end of a switch operation, a switch operation end time (the clock time "time6" in the example of FIG. 6) is held as the final end time of a switch list (e.g., the end time of a piece of switch metadata information in the order T4 of FIG. 4). For instance, a switch list containing the orders "T1" to "T5" in FIG. 4 is completed at this point of time. A playlist is regenerated based on the completed switch list. The playlist is overwritten or recorded with a different file name as a playlist file in, for instance, the recording medium 113. On the other hand, the recording unit 102 finishes a recording processing (e.g., an encoding processing, a clip recording processing, etc.) based on the recording finishing instruction from the switch control unit 105.

It should be noted that the signal processing device 1 has been explained as a single device in the present exemplary embodiment. However, the signal processing device 1 may be formed by a plurality of devices. For example, the configuration may be implemented by configuring the signal recording unit 10, the switch unit 11 and the playlist unit 12 as separate individual devices.

Exemplary Embodiment 2

(1. Configuration of Signal Processing Device)

Figure 9:
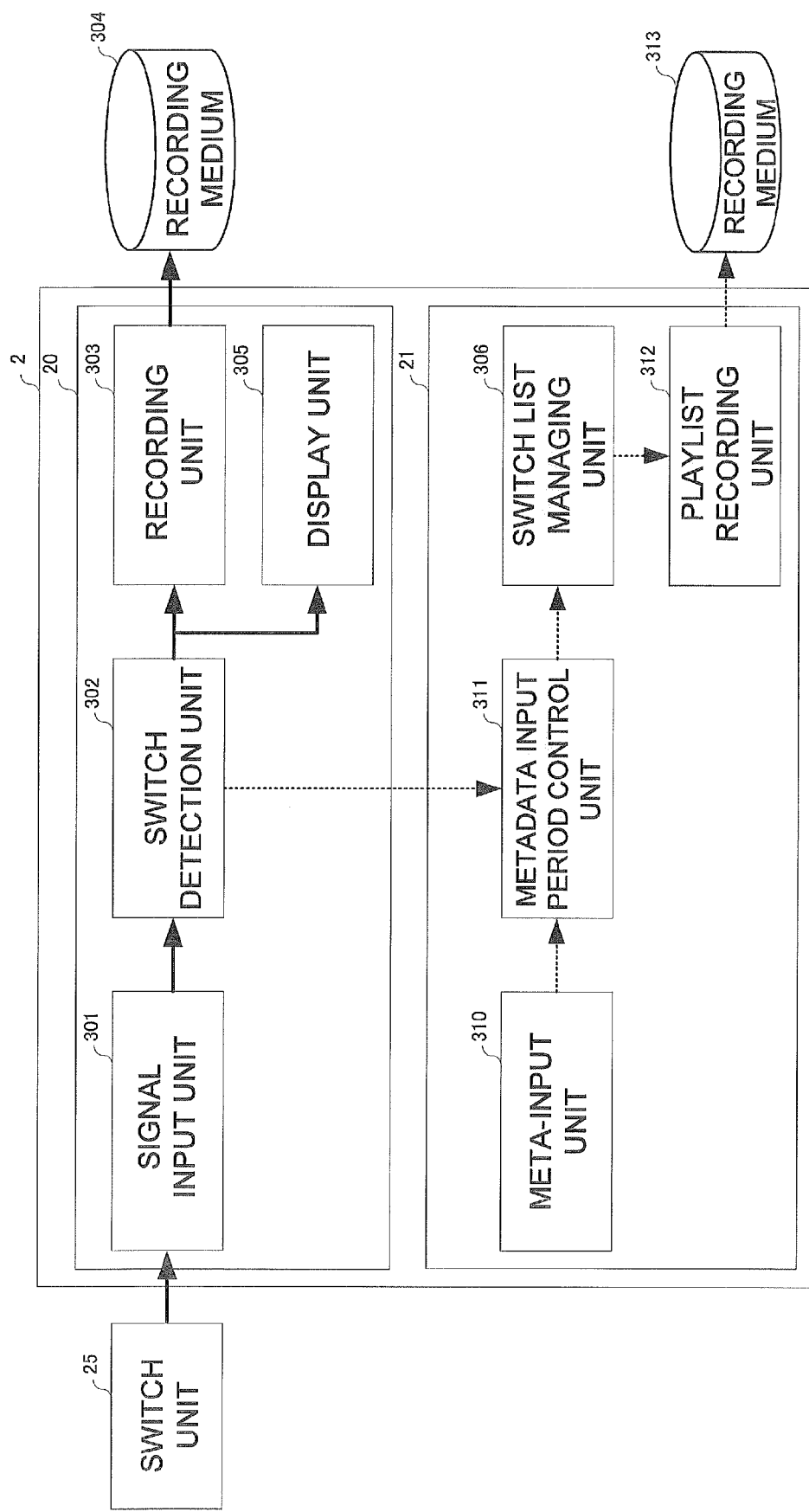
FIG. 9 is a block diagram showing a configuration of a signal processing device in an exemplary embodiment 2.

In an exemplary embodiment 2, another practical example of the present invention will be explained. FIG. 9 is a block diagram showing a configuration of a signal processing device of the exemplary embodiment 2. As shown in FIG. 9, a signal processing device 2 includes a signal recording unit 20 and a playlist unit 21. The signal recoding unit 20 is connected to a recording medium 304. The playlist unit 21 is connected to a recording medium 313. The recording medium 304 and the recording medium 313 respectively corresponds to the recording medium 103 and the recording medium 113 in the exemplary embodiment 1.

A signal, time-multiplexed by a switch unit 25, is herein configured to be inputted into the signal processing device 2. The switch unit 25 is configured to generate a time multiplex signal by means of time-multiplexing and provide the signal processing device 2 with the generated time multiplex signal.

The present exemplary embodiment provides two examples of generating a time multiplex signal in the switch unit 25. In the first example of generating a time multiplex signal, the switch unit 25 is configured to select any one from a plurality of signal paths at a given timing and finally generate a single time multiplex signal by multiplexing a plurality of signals. A specific device example for implementing the first example is a switcher device. The switcher device has been widely used as an audio/video signal processing device for professional applications. Therefore, specific explanation thereof will not be hereinafter provided.

In the second example of generating a time multiplex signal, a method is employed that a time multiplex signal is generated by sequentially reproducing a plurality of sets of recorded signal data on a timeline. A specific device example for implementing the second example is an audio/video signal reproduction device. For example, an audio/video signal reproduction device, used for professional applications and transmission applications in broadcasting, is configured to output an audio/video signal (i.e., a time multiplex signal) by sequentially and consecutively reproducing a plurality of sets of signal data (clips) based on a predetermined time schedule. Such audio/video signal reproduction device is a device widely known in general. Therefore, specific explanation thereof will not be hereinafter provided.

The signal recording unit 20 is formed by a signal input unit 301, a switch detection unit 302, a recording unit 303 and a display unit 305. The signal recording unit 20 is formed by adding the switch detection unit 302 and the display unit 305 to the signal recording unit 10 in the signal processing device 1 according to the exemplary embodiment 1. A signal, inputted from the signal input unit 301, is supplied to the recording unit 303 and the display unit 305 through the switch detection unit 302. The signal input unit 301, the recording unit 303 and the display unit 305 respectively correspond to the signal input unit 101, the recording unit 102 and the display unit 106 in the signal processing device 1 according to the exemplary embodiment 1. Processing executed by the units 301, 303 and 305 are also similar to those executed by the units 101, 102 and 106.

Figure 10:
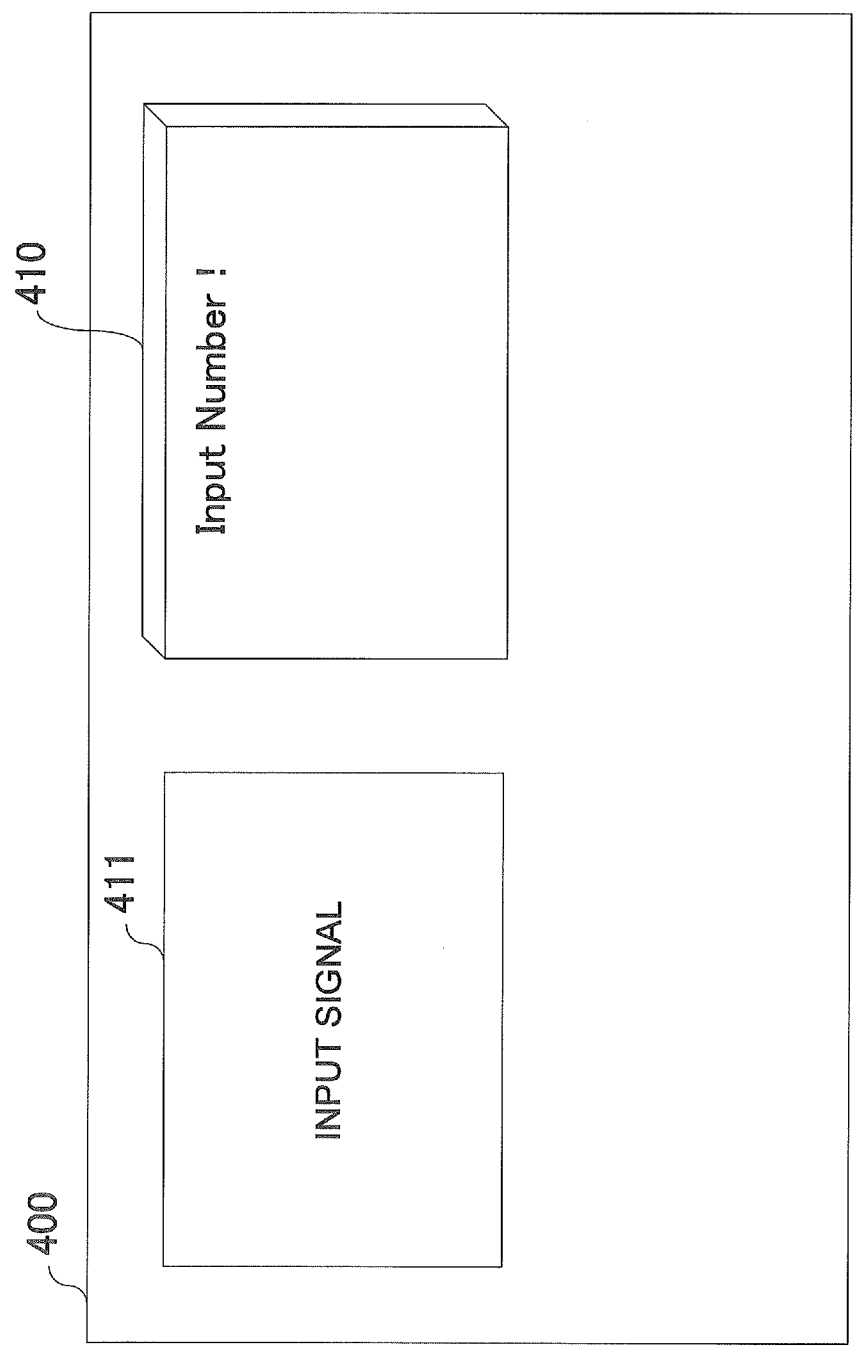
FIG. 10 is a diagram showing a screen configuration example of a signal processing device 2 in the exemplary embodiment 2.

It should be noted that the exemplary embodiment 2 is different from the exemplary embodiment 1 in that only one signal path is provided and a plurality of sets of signal data transmitted through the signal path are time-multiplexed on a timeline. Therefore, the display processing by the display unit 305 is different from that in the signal processing device 1 according to the exemplary embodiment 1. For example, the display unit 305 is configured to display a display screen 400 as shown in FIG. 10. An input signal display area 411 is configured to display therein a signal to be provided from the switch detection unit 302. A metadata input area 410 is configured to display therein a comment and/or etc. for inducing metadata input in the metadata input enabled period. It should be noted an item "PRIORITY METADATA" as a set of metadata will be specifically described below.

Further, the display unit 305 is configured to display only the selection signal display area 204 on the display screen 200 shown in FIG. 2. Yet further, the display unit 305 is configured to display the selection signal display area 254 and the metadata input area 260 on the display screen 250 shown in FIG. 3.

The switch detection unit 302 is configured to detect a switch timing (e.g., a switch flag) with respect to a signal to be provided thereto from the signal input unit 301. A specific processing in switch detection will be described below.

The playlist unit 21 corresponds to the playlist unit 12 in the signal processing device 1 according to the exemplary embodiment 1. Further, a processing executed by the playlist unit 21 is similar to that executed by the playlist unit 12. The playlist unit 21 is formed by a meta-input unit 310, a metadata input period control unit 311, a switch list managing unit 306 and a playlist recording unit 312. The meta-input unit 310, the metadata input period control unit 311, the switch list managing unit 306 and the playlist recording unit 312 respectively correspond to the meta-input unit 110, the metadata input period control unit 111, the switch list managing unit 107 and the playlist recording unit 112 in the signal processing device 1 according to the exemplary embodiment 1. It should be noted that the exemplary embodiment 2 is different from the exemplary embodiment 1 regarding an exemplary set of metadata to be handled.

(2. Explanation of Related Information)

A set of metadata in the exemplary embodiment 2 will be explained by exemplifying the item "PRIORITY METADATA". The item "PRIORITY METADATA" herein refers to a set of metadata for indicating a priority for a clip or a set of signal data in a given period. In the exemplary embodiment 2, a clip or a set of signal data is given a numeric value based on a priority, where a smaller numeric value indicates a higher priority. Processing including rearrangement of order, extraction of an important signal and etc. can be efficiently executed based on the item "PRIORITY METADATA". A user is allowed to input a value (numeric value) for the item "PRIORITY METADATA" through the meta-input unit 310.

Figure 11:
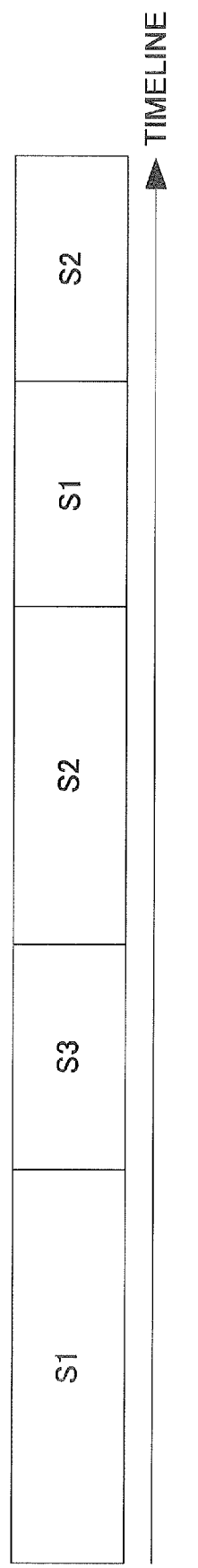
FIG. 11 is a schematic diagram of a time multiplex signal in the exemplary embodiment 2.

Next, explanation will be provided for a time multiplex signal to be inputted into the signal processing device 2. FIG. 11 is a schematic diagram of a time multiplex signal. FIG. 11 shows that respective clips are sequentially aligned, divided along a timeline, and multiplexed as a single signal. In FIG. 11, "S1", "S2" and "S3" represent signals recorded or obtained in different points of time. For instance, in the first example of generating a time multiplex signal, "S1", "S2" and "S3" represent signals (signal path names) switched by the switch unit 25 (e.g., a switcher). By contrast, in the second example of generating a time multiplex signal, "S1", "S2" and "S3" represent clips (clip names) to be reproduced. When such time multiplex signal is inputted, the signal processing device 2 can divide the time multiplex signal again and rearrange the divided sets of signal data.

It should be noted that the terms used in the exemplary embodiment 2 have the same meanings as those used in the exemplary embodiment 1. The signal processing device 2 is different from the signal processing device 1 regarding the processing of generating a piece of switch operation information in the switch detection unit 302 and the processing of generating a playlist in the playlist recording unit 312. Specific explanation will be hereinafter provided for the processing of generating a piece of switch operation information and the processing of generating a playlist.

(3. Generation of Switch Operation Information)

In the exemplary embodiment 2, as a method of switch detection, a case will be explained that the switch unit 25 transmits a signal while a switch flag is multiplexed with the signal. Firstly, explanation will be provided for a method of multiplexing a switch flag with a time multiplex signal. For example, HD-SDI (High Definition Serial Digital Interface) may be used for a method of multiplexing a set of adjunct data with a video signal. HD-SDI is standardized based on SMPTE (Society of Motion Picture and Television Engineers)-292M generally used for professional applications. In HD-SDI, a set of adjunct data can be multiplexed with a video signal by means of data packetization. A switch flag is herein handled as a set of adjunct data and is thereby multiplexed with a video signal. The term "switch flag" refers to a frame indicating switching between clips or a frame indicating switching between signals. For example, the switch flag is multiplexed with the head frame in each clip.

In multiplexing a set of adjunct data with a video signal, an identifier for indicating that a set of adjunct data is a switch flag is set for the head of a packet containing the switch flag. The method of transmitting a video signal with which a set of adjunct data is multiplexed is a technology widely known in general. Therefore specific explanation thereof will not be hereinafter provided.

It should be noted that the exemplary embodiment 2 has exemplified the case of multiplexing a switch flag with a signal. However, a switching point may be configured to be detected from a signal. The technology of detecting a switching point of a video signal or an audio signal is widely used in general. Therefore, specific explanation thereof will not be hereinafter provided.

Next, explanation will be provided for a method of detecting a switch from a time multiplex signal in the switch detection unit 302. The method of detecting a switch will be processed by the following three steps. Firstly, a switch flag multiplexed with a time multiplex signal is extracted. For example, the head of a packet is checked, and an identifier for identifying a switch flag is detected therein. Thus, a packet, containing a switch flag, can be detected and the switch flag can be extracted from the packet. Secondarily, a piece of switch operation information is generated based on the extracted switch flag. For example, a piece of switch operation information is generated by setting a clock time, corresponding to a frame of a signal from which the switch flag is extracted, as a clock time in a switch operation, and by setting a clip name to a selection signal.

The clip name herein refers to a name used for recording of a clip by the recording unit 303, and is configured to be generated by the switch detection unit 302. For example, a clip name "Clip1" is set by adding a number to a character string "Clip". For example, the switch detection unit 302 is configured to generate a clip name based on a method of incrementing the number every time a recording start instruction is given to the recording unit 303. Finally, the switch detection unit 302 is configured to provide the metadata input period control unit 311 with the piece of switch operation information. Subsequently, the playlist generating processing and the playlist recording processing will be executed similarly to the exemplary embodiment 1.

It should be noted that the clip name generated by the switch detection unit 302 is configured to be provided to the recording unit 303 together with the recording start instruction and is set as a clip name for recording. Through the processing, it is possible to match the name of a source clip in a playlist and the clip name for recording.

It should be noted that the switch detection unit 302 is configured to issue a recording start instruction, for instance, at a timing when the switch flag is detected for the first time. On the other hand, the switch detection unit 302 is configured to issue a recording stop instruction, for instance, in response to a user's input corresponding to the end of a switch operation. In other words, the recording unit 303 in the exemplary embodiment 2 is configured to record a time multiplex signal as a single clip.

Through the aforementioned series of processing, the signal processing device 2 is configured to record a single clip in the recording medium 304. Further, through the processing in the playlist recording unit 312 and etc., the signal processing device 2 is configured to divide a single clip into a plurality of reproduction durations based on a playlist and rearrange the reproduction durations.

(4. Generation of Playlist)

Specific explanation will be provided for a processing of generating a playlist from a switch list by the playlist recording unit 312. FIG. 12 shows a specific example of a switch list in the exemplary embodiment 2. Except for the item "SIGNAL PATH" as a piece of switch information and the item "PRIORITY METADATA" as a set of metadata, items of the switch list in the exemplary embodiment 2 are the same as those of the switch list example in the exemplary embodiment 1 shown in FIG. 4. In the exemplary embodiment 2, not the input path in FIG. 4 but a clip name generated in the switch detection unit 302 (e.g., "Clip1" in FIG. 12) is used for a value of the item "SIGNAL PATH" as a piece of switch information. Further, the item "PRIORITY METADATA" is used as a set of metadata. Therefore, the item "PRIORITY METADATA" is prepared in FIG. 12, instead of the item "EVALUATION METADATA" in FIG. 4.

Figure 13:
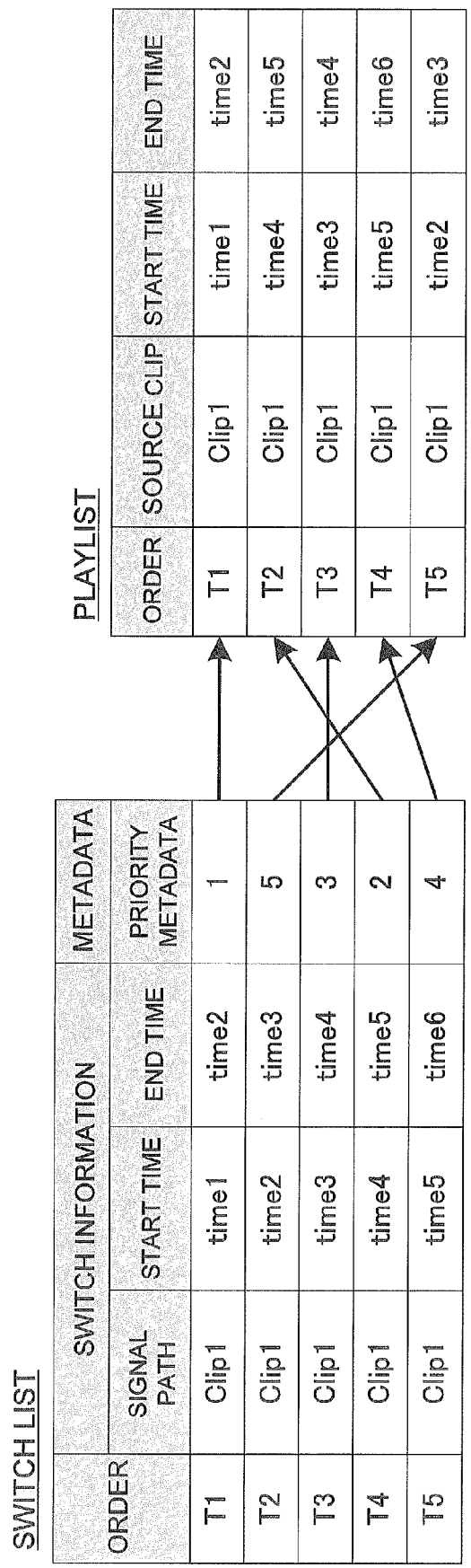
FIG. 13 is a diagram showing a specific example of generating a playlist from the switch list in the exemplary embodiment 2.

FIG. 13 shows a specific example of generating a playlist based on the switch list example of FIG. 12. The order in the playlist is determined based on the values (numeric values) of the item "PRIORITY METADATA" in the switch list of FIG. 12. For example, a piece of switch metadata information, containing the item "PRIORITY METADATA" valued as 1, is associated with respective information items with the order "T1" in the playlist. On the other hand, a piece of switch metadata information, containing the item "PRIORITY METADATA" valued as 2, is associated with respective information items with the order "T2" in the playlist. In the exemplary embodiment 2, a smaller value of the item "PRIORITY METADATA" herein indicates higher importance. Further, in the exemplary embodiment 2, a rule is employed that a clip with the a higher priority is disposed on the higher order in the playlist. Next, values of respective items are determined based on the correspondence between respective pieces of switch metadata information in the switch list and respective playlist elements in the playlist. In the example of FIG. 13, values of the items "SIGNAL PATH", "START TIME" and "END TIME" in a piece of switch metadata information are respectively set for the items "SOURCE CLIP", "START TIME" and "END TIME" in a corresponding playlist element. It should be noted that the item "PRIORITY METADATA" is expressed as the item "ORDER" in the playlist. Therefore, the item "PRIORITY METADATA" is not necessary in the playlist, and may be deleted from the playlist. The playlist recording processing and etc. except for the playlist generating processing in the playlist recording unit 312 are executed similarly to those executed by the playlist recording unit 112 in the exemplary embodiment 1.

Exemplary Embodiment 3

(1. Configuration of Signal Processing Device)

In an exemplary embodiment 3, explanation will be provided for a practical example of a signal processing device for reproducing a recording medium, for which recording is executed by the signal processing devices of the exemplary embodiments 1 and 2, and for modifying a playlist. It should be noted that the terms to be used in the exemplary embodiment 3 have the same meanings as those used in the exemplary embodiments 1 and 2.

Figure 14:
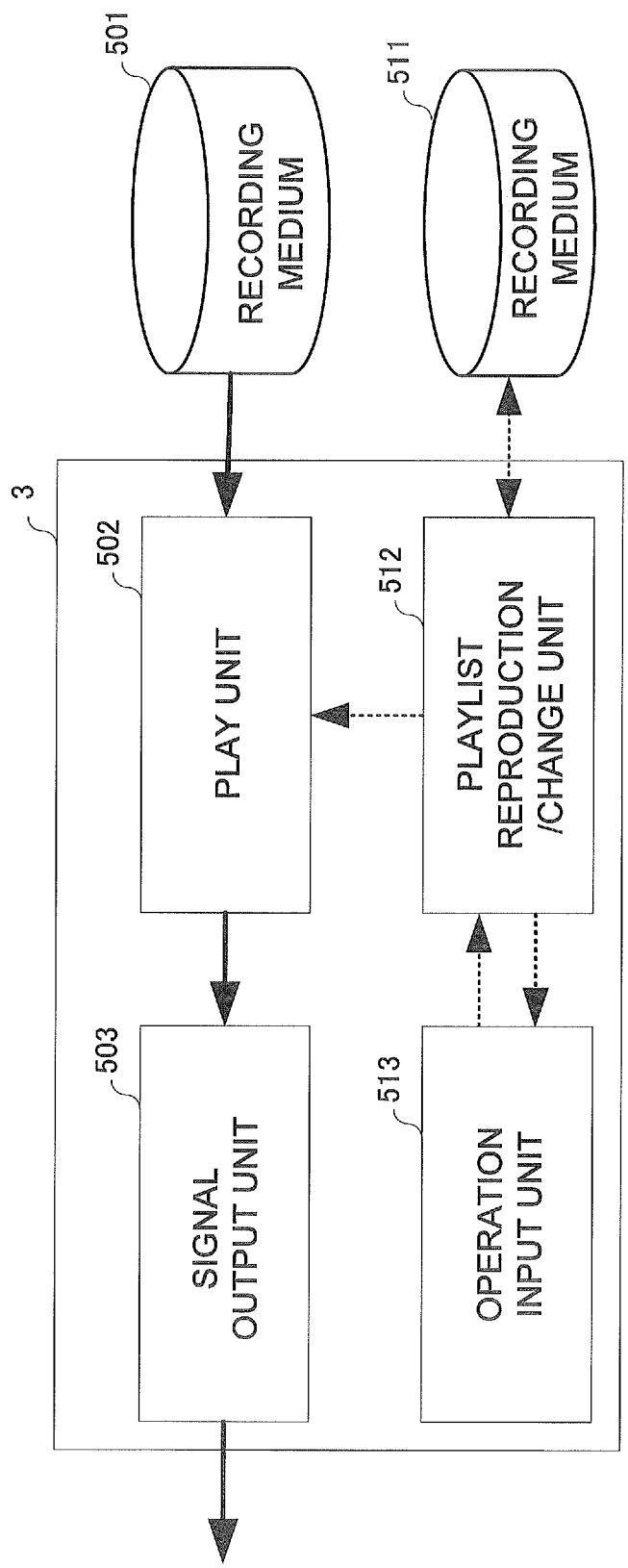
FIG. 14 is a block diagram showing a configuration of a signal processing device in an exemplary embodiment 3.

FIG. 14 is a block diagram showing a configuration of a signal processing device according to the exemplary embodiment 3. A signal processing device 3 is a device for reproducing a playlist recorded in either the recording medium 113 or the recording medium 313 by the signal processing device of the exemplary embodiment 1 or 2 and for reproducing a clip recorded in either the recording medium 103 or the recording medium 304 by the signal processing device of the exemplary embodiment 1 or 2. Further, the signal processing device 3 includes means for changing a playlist.

As shown in FIG. 14, the signal processing device 3 includes a reproduction unit 502, a signal output unit 503, a playlist reproduction/change unit 512 and an operation input unit 513. Further, the reproduction unit 502 is connected to a recording medium 501, whereas the playlist reproduction/change unit 512 is connected to a recording medium 511. The recording medium 501 is a recording medium for recording therein a set of signal data. The recording medium 501 corresponds to the recording medium 103 in the exemplary embodiment 1 and the recording medium 304 in the exemplary embodiment 2. The recording medium 511 is a recording medium for recording therein a playlist. The recording medium 511 corresponds to the recording medium 113 in the exemplary embodiment 1 and the recording medium 313 in the exemplary embodiment 2.

Next, a processing flow in reproducing will be explained. A user inputs a reproduction instruction through the operation input unit 513. For example, the reproduction instruction is configured to be inputted in response to pressing of a reproduction button (not shown in the figures). The reproduction instruction is provided to the reproduction unit 502 from the operation input unit 513 through the playlist reproduction/change unit 512. The reproduction unit 502 is configured to reproduce a set of signal data (clip) recorded in the recording medium 501 based on the reproduction instruction from the playlist reproduction/change unit 512. The reproduced signal is configured to be supplied to the signal output unit 503. The signal output unit 503 is configured to output the signal provided thereto from the reproduction unit 502 to the outside of the device. For example, the signal output unit 503 is connected to a video monitor in the case of a video signal, whereas being connected to a speaker in the case of an audio signal. The playlist reproduction/change unit 512 is configured to read out a playlist (playlist file) from the recording medium 511 and give instructions of the reproduction duration and the order of the respective sets of signal data to the reproduction unit 502. Accordingly, the reproducing processing is implemented by reproducing the reproduction durations (from the start time to the end time) of the respective sets of signal data (respective playlist elements) recorded in the playlist in the order recorded in the playlist.

On the other hand, the operation input unit 513 is configured to input a user's display and operational instruction regarding modification of a playlist. The operational instruction to be inputted by a user is configured to be supplied to the playlist reproduction/change unit 512 through the operation input unit 513. The playlist reproduction/change unit 512 is configured to change the playlist based on the operational instruction provided thereto from the operation input unit 513. Further, the playlist reproduction/change unit 512 is configured to record the changed playlist in the recording medium 511. The recording is herein executed by, for instance, a method of overwriting a playlist file or a method of providing the file name of a playlist file with a date and recording the playlist file as another file. The specific processing in changing a playlist will be described below.

Figure 15:
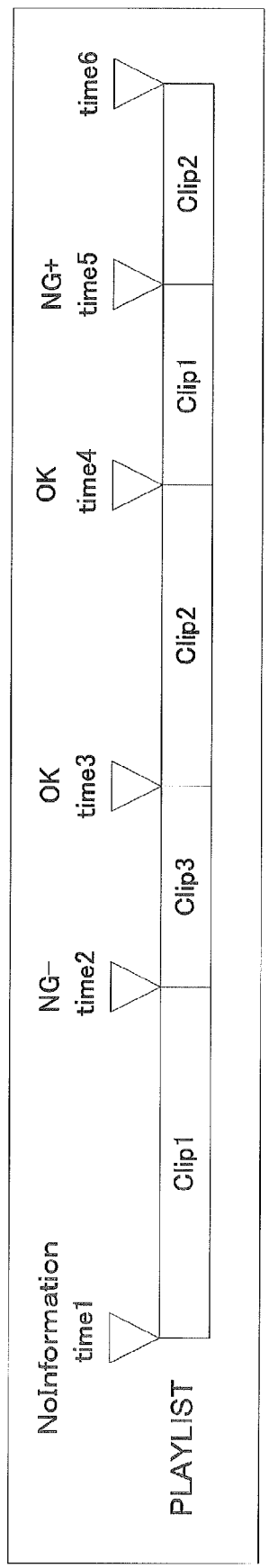
FIG. 15 is a diagram showing a configuration example of a playlist display screen of the signal processing device 3 in the exemplary embodiment 3.

Further, when reading out a playlist, the playlist reproduction/change unit 512 is configured to provide the operation input unit 513 with the read-out piece of playlist information. The operation input unit 513 is configured to arbitrary give a display instruction based on the piece of playlist information provided thereto from the playlist reproduction/change unit 512. Now, FIG. 15 shows a configuration example of a playlist display screen. The playlist display screen of FIG. 15 partially displays items of a piece of switch metadata information (e.g., start time and metadata) on a timeline. FIG. 15 corresponds to the playlist of FIG. 5 in the exemplary embodiment 1. The set of metadata indicates a value of the item "EVALUATION METADATA" associated with the item "START TIME" in a switch operation.

The reproducing processing and the metadata display processing based on a playlist are technologies widely used in general. Therefore, specific explanation thereof will not be hereinafter provided.

(2. Change of Playlist)

Figure 16:
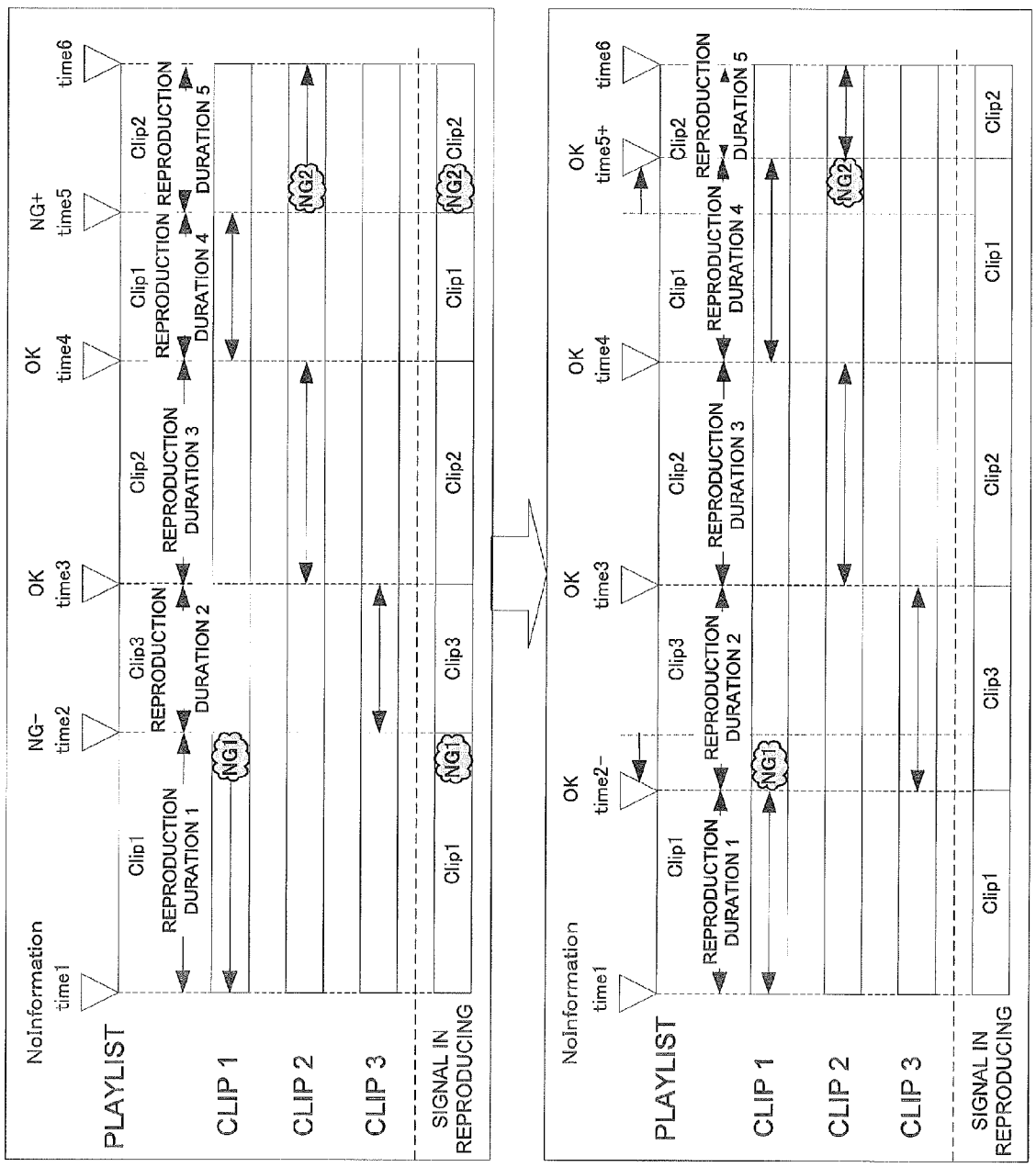
FIG. 16 is a schematic diagram in changing a playlist of the signal processing device 3 in the exemplary embodiment 3.

Specific explanation will be provided for the processing of changing a playlist in the playlist reproduction/change unit 512. FIG. 16 is a schematic diagram regarding change of a playlist in the exemplary embodiment 3. The upper table of FIG. 16 shows a pre-change playlist and a reproduction state of each clip, and corresponds to the playlist example of FIG. 5 in the exemplary embodiment 1. Further, the lower table of FIG. 16 shows a post-change playlist and a reproduction state of each clip.

For example, in the upper table of FIG. 16, the pre-change playlist expresses that a switch operation was delayed than a desired timing at the clock time "time2". In the table, "NG1" indicates a duration that an undesired signal was outputted immediately before the clock time "time2" in response to a user's delayed switch operation. Similarly, "NG2" indicates a duration that an undesired signal was outputted immediately after the clock time "time5" because a user's switch operation was advanced than a desired timing at the clock time "time5".

Compared to the above, in the post-change playlist and a reproduction state of each clip in the lower table of FIG. 16, the end terminal of a reproduction duration of the initial Clip1 (i.e., REPRODUCTION DURATION 1) is changed from the clock time "time2" to a clock time "time2−" in order to prevent a signal in reproducing from outputting a signal corresponding to the duration "NG1". The clock time "time2−" herein refers to a clock time that comes after the clock time "time1" and before the clock time "time2". Simultaneously with the change, the initial terminal of "REPRODUCTION DURATION 2" as the next reproduction duration is changed into the same clock time (i.e., the clock time "time2−"). Accordingly, delay of a switch operation is modified. Further, when the switch selection of "REPRODUCTION DURATION 1" is not desired, the playlist is changed so that "REPRODUCTION DURATION 1" in itself is deleted or another clip is reproduced. Similarly, the end terminal of "REPRODUCTION DURATION 4" is changed from the clock time "time5" to a clock time "time5+" in order to prevent a signal in reproducing from outputting a signal corresponding to the duration "NG2". The change amount of the clock time (changed time) is set by, for instance, a method of setting the changed time by a user's input and a method of setting the changed time to be a preliminarily set changed time. In the exemplary embodiment 3, explanation will be provided for the exemplary method of setting the changed time by a user's input.

Next, specific explanation will be provided for the processing of a playlist change operation in the operation input unit 513. For example, when a display screen as shown in FIG. 15 is displayed, a user can easily identify an undesired switch operation with reference to the values of the item "EVALUATION METADATA" (e.g., "NG−" or "NG+"). The operation input unit 513 is configured to shift a switch operation timing (i.e., clock time) corresponding to a value of the item "EVALUATION METADATA" (e.g., "NG+" and "NG−") on a timeline. In the example of FIG. 15, the clock time "time2" with the item "EVALUATION METADATA" valued as "NG−" is selected as a first playlist change operation. The clock time "time2" is then changed into (shifted on a timeline to), for instance, a clock time "time2−". Further, a clock time "time5" with the item "EVALUATION METADATA" valued as "NG+" is selected as a second playlist change operation. The clock time "time5" is then changed into (shifted on a timeline to), for instance, a clock time "time5+". The changed time is calculated based on the displacement on the timeline. Such operations are functions widely known, for instance, in video editing devices. Further, the operation input unit 513 is configured to provide the playlist reproduction/change unit 512 with the pieces of operation information. The playlist reproduction/change unit 512 is configured to modify values of relevant playlist elements based on the pieces of operation information supplied thereto from the operation input unit 513.

To change the playlist, the playlist reproduction/change unit 512 is configured to modify the values of the items "START TIME", "END TIME" and "EVALUATION METADATA" in the playlist. For example, FIG. 17 shows a playlist example obtained by changing the playlist of FIG. 5. FIG. 17 is a specific example of a playlist obtained by changing the playlist of FIG. 16.

FIG. 17 shows a result of changing values of the item "END TIME" of a playlist element in an order "T1", the items "START TIME" and "EVALUATION METADATA" of a playlist element in an order "T2", the item "END TIME" of a playlist element in an order "T4" and the items "START TIME" and "EVALUATION METADATA" of a playlist element in an order "T5". Switching positions are herein shifted to desired positions based on a user's operation. Therefore, a value "OK", indicating that a switch operation has no problem, is herein set as the values of the item "EVALUATION METADATA" of the respective playlist elements in the orders "T2" and "T5".

Specifically, in such playlist change, the value of the item "END TIME" of the playlist element in the order "T1" of FIG. 17 and the values of the items "START TIME" and "EVALUATION METADATA" of the playlist element in the order "T2" of FIG. 17 are changed based on the first playlist change operation. On the other hand, the value of the item "END TIME" of the playlist element in the order "T4" in FIG. 17 and the values of the items "START TIME" and "EVALUATION METADATA" of the playlist element in the order "T5" of FIG. 17 are changed based on the second playlist change operation.

It should be noted that the signal processing device 3 may be arbitrarily configured to include the signal processing device 1 according to the exemplary embodiment 1 and the signal processing device 2 according to the exemplary embodiment 2. For example, the configuration can be implemented by setting a block including two devices as a single device.

INDUSTRIAL APPLICABILITY

The present exemplary embodiments of the present invention serve to remarkably enhance convenience of a user in a signal processing device handling a plurality of signals. The present signal processing device is widely applicable to a variety of devices such as a video recording device to which a semiconductor memory, an optical disk and etc. are applied, a switcher device, an audio/video distribution/transmission device and a multi-camera system for shooting with use of a plurality of cameras

GENERAL INTERPRETATION OF TERMS

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the signal processing device. Accordingly, these terms, as utilized to describe the technology disclosed herein should be interpreted relative to the signal processing device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A signal processing device, comprising:
   a recording device configured to record an inputted signal in a recording medium;
   a switch input device configured to input signal selection information for selecting any one of a plurality of signals;
   a meta-input device configured to input metadata indicating a validity of timing in a signal selection, the meta-input device provided independently from the switch input device;
   a switch list controller configured to manage the signal selection information and the metadata inputted in the meta-input device in association with each other as a switch metadata information every time the signal selection information is inputted into the switch input device; and
   a playlist recording device configured to determine a reproduction duration of each clip and generate a playlist including the metadata based on the switch metadata information and to output the playlist to the recording medium.

2. The signal processing device according to claim 1, wherein
the meta-input device is configured to receive the metadata during a predetermined period of time from a clock time when the signal selection information is inputted into the switch input device.

3. The signal processing device according to claim 2, further comprising:
a first signal input device configured to input signals of a plurality of signal paths; and
a switch control device configured to select any one of the signal paths based on the signal selection information inputted into the switch input device, wherein
the recording device is configured to output the signals of the signal paths to the recording medium, and
the signal selection information for selecting the any one of the signal paths is inputted into the switch input device.

4. The signal processing device according to claim 3, wherein
the signal selection information includes at least one of clock time information and signal path information.

5. The signal processing device according to claim 2, wherein
the playlist recording device is configured to generate the playlist and output the playlist to the recording medium every time the signal selection information is inputted into the switch input device.

6. The signal processing device according to claim 1, further comprising:
a playlist change device configured to change the reproduction duration in the playlist based on the metadata contained and recorded in the playlist.

7. The signal processing device according to claim 1, wherein
the signal includes a video signal.

* * * * *